United States Patent Office 2,951,783
Patented Sept. 6, 1960

2,951,783
POLYMER OF TRIFLUOROCHLOROETHYLENE AND PREPARATION THEREOF

Billy F. Landrum, Cedar Grove, N.J., and Ralph L. Herbst, Jr., Worcester, Mass., assignors, by mesne assignments, to Minnesota Mining and Manufacturing Company, St. Paul, Minn., a corporation of Delaware No Drawing. Filed Oct. 25, 1956, Ser. No. 618,179

14 Claims. (Cl. 154—139)

This invention relates to polymers containing halogen. In one aspect the invention relates to a halogen-containing interpolymer. In another aspect the invention relates to the manufacture and application of a copolymer of trifluorochloroethylene.

Halogen-containing polymers and especially the polymers containing fluorine are relatively inert and have good physical and chemical stability. One of the most useful polymers of this field is a halocarbon homopolymer of trifluorochloroethylene. The thermoplastic homopolymer of trifluorochloroethylene has a unique combination of physical and chemical characteristics which has led to its use in a variety of industrial applications. Physically, polytrifluorochloroethylene homopolymer possesses high thermal stability and excellent electrical properties and is, therefore, widely used as an electrical insulator where high temperatures are encountered. Chemically, this thermoplastic offers excellent resistance to highly corrosive chemicals, solvents, etc. and is, therefore, widely used as a protection medium. The thermoplastic homopolymer of trifluorochloroethylene can be fabricated into a wide variety of useful items by molding and other standard techniques. However, in many instances, for example, in applying the plastic polymer as coatings or films on surfaces which are subjected to elevated temperatures, it has been found essential to maintain the polymer at a relatively high molecular weight in order to avoid embrittlement of the polymer on heat aging. In other instances, for example, in the preparation of laminates, the non-adhesive character of the plastic polymer has seriously limited the utility of the polymer. A number of techniques have been proposed for applying the polymer surface to other surfaces. Thus, the polymer film has been bonded to fiberglass fabric which in turn is bonded to the other surface by means of a suitable adhesive. This technique involves the use of costly presses, long cycles, and interrupted production and is not always satisfactory.

It is an object of this invention to provide a polymer which has similar physical and chemical characteristics to polymers of a fluorine-containing olefin such as trifluorochloroethylene and which has improved adhesion properties and can be applied readily and conveniently to surfaces at high temperatures without degradation.

Another object of this invention is to provide a polymer which is not subject to embrittlement of the film when it is placed in service at high temperatures, for example, at temperatures of 100° C. to 200° C.

Still another object of this invention is to provide an adhesive for use in preparing halogenated olefin polymer laminates.

A further object of the invention is to provide a process for adhering or bonding a polymer of trifluorochloroethylene including the homopolymer and copolymers thereof to metals such as copper, iron, steel, aluminum, and brass and to other solid materials such as glass and porcelain.

A further object of this invention is to provide a process for bonding or adhering a polymer of trifluorochloroethylene including the homopolymer and copolymers thereof to natural textiles, synthetic organic textiles and to synthetic inorganic textiles.

A still further object is to provide a particular novel polymer composition containing fluorine, and a method for the manufacture thereof.

Various other objects and advantages of this invention will become apparent to those skilled in the art from the accompanying description and disclosure.

It has now been found that the polymers produced by polymerizing a monomer mixture of a fluorine-containing olefin such as trifluorochloroethylene and a diunsaturated ester of maleic acid under conditions to be more fully described hereinafter, leads to the production of a polymer which possesses improved adhesion properties as compared to the homopolymer of the fluoroolefin. The preferred polymer composition of this invention is specifically a thermoplastic copolymer prepared from a monomeric mixture of trifluorochloroethylene and diallyl maleate in proportions of more than 90 mol percent of trifluorochloroethylene and less than 10 mol percent of diallyl maleate. It is preferred to employ a minimum amount of 0.1 mol percent of diallyl maleate. The ultimate composition of the copolymer produced with the above percentages of monomers is within a similar range of composition containing more than about 90 mol percent of combined monomer units of trifluorochloroethylene and less than about 10 mol percent of the monomer, diallyl maleate. When higher percentages of diallyl maleate above 10 mol percent, are employed in the monomer mixture, the resultant copolymer product is of relatively low molecular weight in the oil and grease range and is obtained in relatively low conversions.

The preferred composition of the copolymer contains between about 0.5 and about 8 mol percent of diallyl maleate and best results are realized with a copolymer containing between about 1 and about 6 mol percent of diallyl maleate. The copolymer containing from about 2 to about 6 mol percent of diallyl maleate exhibits ideal flow characteristics at fusion temperatures of application at 200° C. to about 250° C. with a minimum amount of time required for its application. The preferred copolymer of this invention exhibits substantially all of the chemical and physical properties of the homopolymer of trifluorochloroethylene as to chemical stability, swelling by solvents, weight loss due to heat aging, and electrical properties. The preferred copolymers of this invention, i.e. those having more than about 90 mol percent of trifluorochloroethylene and prepared as described herein have an N.S.T. value above about 210° C. and usually not higher than about 350° C. and possess the added advantages over the homopolymer of trifluorochloroethylene of improved adhesion to hard and fabric surfaces and negligible embrittlement upon heat aging. The improved heat aging properties are observed even with copolymers possessing an N.S.T. lower than 250° C.

In the preparation of the presently described copolymers of trifluorochloroethylene and diallyl maleate, the monomers are mixed and maintained at a temperature usually between about −30° C. and about 75° C. or 100° C. for a period of time between about 30 minutes and about 12 days depending upon such factors as the particular temperature and promoter employed. The preferred temperature of polymerization is between about −20° C. and about 40° C. or 50° C. employing a suitable promoter.

In general, organic peroxide promoters such as the halogenated acetyl peroxides are employed when the copolymer is prepared in the absence of a suspension agent. Trichloroacetyl peroxide is the preferred promoter in this instance. Various other halogenated organic peroxides such as difluorochloroacetyl peroxide, trifluoroacetyl peroxide, 2,4-dichlorobenzoyl peroxide, and chloroacetyl peroxide also are suitable for promoting the copolymerization.

The polymerization may be effected with a suspension agent such as water or an organic liquid such as fluorocarbon oils without departing from the scope of this invention. These suspension agents are diluents in which the monomers and copolymers are suspended during polymerization and serve to withdraw heat from the polymerization in the case of suspension or emulsion technique of polymerizing particularly in the case of water emulsion polymerization. The preferred promoters include the inorganic promoters such as the persulfates, perborates, peroxides, and perphosphates. Of these promoters ammonium persulfate and the alkali metal persulfates such as potassium and sodium persulfate are preferably employed. The weight ratio of suspension agent or diluent to total monomer is between about 0.05 to about 10.

The concentration of promoter in the polymerization mixture varies over a considerable range but generally is within the range of between about 0.01 to about 5 weight percent based on the total monomer in the reactor. In a continuous operation in which the concentration of the promoter may be maintained relatively constant within narrow limits, the concentration of the promoter in the reaction zone will, therefore, correspond substantially at all times to the preferred composition for the particular product being produced. On the other hand, in batchwise or bulk polymerization excess promoter is employed initially which concentration decreases by consumption during polymerization.

Various emulsifiers, activators, and accelerators may be employed in conjunction with the promoter without departing from the scope of this invention. Suitable emulsifiers which may be employed comprise metal salts such as the potassium or sodium salt derivatives derived from saturated aliphatic acids, the optimum chain length of the acid being between about 14 and about 20 carbon atoms, and the various salt derivatives of fluorochloroalkanoic acids and fluoroalkanoic acids having between about 6 and about 20 carbon atoms per molecule. Typical examples of the derivatives of aliphatic acids which may be employed are potassium stearate and potassium oleate and mixtures thereof. The derivatives of fluoroalkanoic acids which may be used include the metal salts of perfluorocarboxylic acids such as potassium perfluorooctanoate and the derivatives of the polyfluoroalkanoic acids disclosed in U.S. Patent No. 2,559,752 as being effective dispersing agents in polymerization reactions. The preferred fluorochlorocarboxylic acid derivatives which may be used as emulsifiers are those of the perfluorochloro acids obtained upon hydrolysis of trifluorochloroethylene-sulfuryl chloride telomers in fuming sulfuric acid. Such perfluorochloro acids have the successively recurring unit,

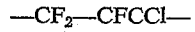

and a chlorine-containing end group and an even number of carbon atoms which is preferably between about 6 and about 14 carbon atoms. Typical examples of such emulsifiers are the potassium, sodium and ammonium salts of 3,5,7,8-tetrachloroundecafluorooctanoic acid and of 3,5,6-trichlorooctafluorohexanoic acid. The emulsifier is generally employed in a quantity between about 0.2 and about 10 parts by weight per 100 parts of total monomer and preferably between about 0.5 and about 5.0 parts by weight are used.

Activators which are often used in conjunction with the peroxy compound comprise sodium bisulfite, sodium metabisulfite, sodium thiosulfate, sodium hydrosulfate, a reducing sugar such as dextrose and levulose and, in general, any water soluble reducing agent. Such activators are generally employed in an amount between about 0.2 and about 0.8 part by weight per 100 parts of total monomers employed. Equimolar amounts of promoter and activator are generally preferred.

Accelerators which may be employed in the aqueous polymerization systems comprise water soluble variable valence metal salts of sulfates, nitrates, phosphates and chlorides such as cuprous sulfate, ferrous sulfate and silver nitrate. Such activators are generally employed in an amount between about 0.01 and about 1.0 part per 100 parts of total monomers employed and preferably in an amount between about 0.05 and 0.5 part by weight. When an activator such as sodium metabisulfite, and an accelerator such as ferrous sulfate are employed, the catalyst system is referred to as a redox system.

In bulk polymerization in which the polymerization is permitted to proceed until the monomers are converted to the desired plastic, the form of the product is a porous solid plug containing unreacted monomers in the interstices of the solid plug of polymer. In another type of polymerization in which the polymer is permitted to form a slurry in a mass of liquid reaction medium, the polymer is recovered either in the form of a latex or as finely divided particles from the slurry by filtration or other conventional means.

The following example is offered as a better understanding of this invention and is not to be construed as unnecessarily limiting thereto. This example illustrates the preparation of one of the preferred copolymers of this invention.

*Example 1*

A glass polymerization tube having a volume capacity of 200 ml. was flushed with nitrogen, then the tube was charged with the following: 40 ml. of water containing 1.0 gram of dissolved ammonium persulfate, 20 ml. of water containing 0.5 gram of dissolved sodium metabisulfite, 30 ml. containing 0.07 gram of dissolved ferrous sulfate heptahydrate and 59 ml. of water. The contents of the tube were frozen after each addition. The tube was then evacuated. Thereafter 49.7 grams of trifluorochloroethylene and approximately 4 mol percent maleate were added thereto. The tube was then sealed and warmed to a temperature of about 5° C. and rotated end-over-end for a period of 20 hours maintaining the temperature of 5° C. The residual monomer was then vented from the tube and a mixture of water and polymer were discharged. The polymer was washed with hot water to remove residual salts and was then dried in vacuo at room temperature. The polymer was found to contain approximately 96 mol percent of combined trifluorochloroethylene and approximately 4 mol percent of combined diallyl maleate based upon chlorine and fluorine analysis. The coplymer was obtained in a 72 percent conversion.

The copolymer produced in accordance with the above example was found to have an N.S.T. value of 255° C. and a dilute solution viscosity of 0.71 centistoke as determined in a 0.75 percent solution of dichlorobenzotrifluoride at 266° F. This copolymer was then subjected to the heat aging mandril test which involves heat aging 5″ x ⅜″ x ⅟₁₆″ polymer strips and after heat aging at 190° C., the strips are subjected to reverse bends around a ⅜″ mandril. Thirty bends without breaking is considered passing. The trifluorochloroethylene/diallyl maleate copolymer of the above example is found to pass the mandril test after 15 days whereas polytrifluorochloroethylene homopolymer having a N.S.T. of 264 and lower exhibits partial failure of the mandril test after 15 days.

By employing procedures similar to that set-forth in Example 1 above, trifluorochloroethylene-diallyl maleate copolymers were prepared having N.S.T. values of 306° C. and 316° C. and passed the above-described heat aging mandril test after 10 days of heat aging at 190° C.

As indicated above, the copolymers of this invention may be applied as protective coating to various surfaces. The application of the copolymer to the surface is usually effected by applying a dispersion of the copolymer to the surface followed by evaporation of the dispersion medium followed by fusion or sintering of the particles of the copolymer on the surface to form a continuous uniform film. In preparation of the dispersion, the polymer is ground to a relatively small size, for example, a size less than about 10 mesh. After pulverization of the polymer, the polymer and dispersion medium are admixed and the polymer further ground in a ball mill or other conventional types of grinders. The concentration of the copolymer in the dispersion is usually between about 10 and about 30 percent.

Various dispersing media may be employed in dispersing the copolymer of this invention for application to surfaces. Such dispersing media usually comprise a dispersing agent and diluent. Suitable dispersing agents comprise the aliphatic and aromatic esters, the ether alcohols and ketones. Typical examples of the dispersing agents are triisobutyl ketone, methyl isobutyl ketone, methyl acetate, ethyl benzoate, and ethoxy ethanol. Typical examples of suitable diluents to be used are the aromatic hydrocarbons such as xylene, toluene or benzene; hydrocarbon oil fractions containing large amounts of aromatic hydrocarbons, aliphatic alcohols, unsubstituted ethers, and water.

Surfaces may be coated by dipping the surfaces of the article into the dispersion followed by fusion or sintering. Usually two or more dips with fusion between dips are required to obtain the desired thickness of uniform film upon the surface of the article. After each dip the surface containing the deposited plastic thereon is fused or sintered by heat at elevated temperatures, usually not higher than about 250° C. for a period of time between ½ minute and about ½ hour.

Another method of applying the plastic copolymers of this invention to surfaces includes dissolving the copolymer in a suitable solvent and evaporating the solvent after application of the solution to the surface to be coated. This procedure may be repeated until a desired or sufficient film thickness is obtained.

The trifluorochloroethylene-diallyl maleate thermoplastic copolymers are particularly useful as an adhesive for bonding a halogenated polymer surface such as a polymer of trifluorochloroethylene including both homopolymers and copolymers to other surfaces. Thus, the trifluorochloroethylene-diallyl maleate copolymer may be applied to one of the components to be bonded. This coated surface is then maintained in contact with a surface of the component to which it is to be bonded under slight pressure and at elevated temperatures to produce a laminated structure in which individual components are strongly bonded together. The surface of the second component to which the copolymer surfaces of this invention may be bonded includes various polymer surfaces such as those of trifluorochloroethylene/vinylidene fluoride copolymers and trifluorochloroethylene/tetrafluoroethylene copolymers and other polymeric and non-polymeric materials. Thus, the above laminate comprising the copolymer of this invention bonded to polytrifluorochloroethylene homopolymer, for example, may be bonded to metals such as iron, steel, aluminum, copper, and brass and to other non-metallic surfaces such as glass and porcelain. In addition, the second component may be a natural fiber textile such as cotton, wool, and canvas, a synthetic organic textile such as nylon and Orlon and inorganic textiles such as fiberglass, asbestos, etc.

When the copolymers of this invention are employed as adhesives, the copolymer is preferably dissolved or dispersed in a solvent. A particularly suitable solvent is tetrahydrofuran. The adhesive is applied to the surface of at least one of the components which is to be bonded by any convenient technique. Thus, the copolymer may be dissolved in a solvent and the resulting solution applied by brushing, spraying, dipping, or any other conventional procedure. When used in the form of a solution, the adhesive may constitute between about 1 and about 40 percent by weight of the solution, preferably between about 5 and about 20 percent by weight. When a solvent is used, the solvent is preferably evaporated before the adhesive is placed in contact with the second surface since the adhesive dries more readily. Evaporation, before contact is made with the second surface, is preferably achieved by heating at elevated temperatures up to 100° C. in an oven or by circulating heated air, although air drying at ambient temperatures may be used where time is not a factor. The copolymer may also be applied in dry form either as a film or as a powder.

After the surface of one of the components has been coated with the trifluorochloroethylene/diallyl maleate copolymeric adhesive, the surface of the second component is brought into contact with the coated proportion of the first surface. The resulting assembly is then maintained at an elevated temperature and under slight pressure. A temperature of at least 100° C. and below the decomposition temperature of the materials may be used. Usually the temperature is maintained between about 140° C. and about 300° C., preferably between about 165° C. and about 200° C. A pressure of at least 5 pounds per square inch is necessary although pressures substantially in excess of 5 pounds per square inch, i.e. up to about 25,000 pounds per square inch may be used. Preferably a pressure between about 20 and about 100 pounds per square inch is used. The time necessary to effect bonding is usually between about 0.5 second and 10 minutes.

In order to further illustrate the utility of the polymers of this invention, the following examples are offered for the purposes of illustration and are not to be construed as unnecessary limiting thereto.

*Example 2*

A polytrifluorochloroethylene homopolymer film is coated with a solution of the copolymer of trifluorochloroethylene and diallyl maleate produced in accordance with Example 1 above. The solvent is allowed to evaporate and the coated surface is placed in contact with another polytrifluorochloroethylene homopolymer film. This assembly is then heated at a temperature of about 150° C. and a pressure of about 45 pounds per square inch gage. A strong bond is thereby produced.

*Example 3*

A polytrifluorochloroethylene homopolymer film is coated with the trifluorochloroethylene/diallyl maleate copolymer of Example 1 above. The coated surface thereby produced is placed in contact with the aluminum sheet. This assembly is then heated as described in Example 2 above to produce a coating firmly bonded on aluminum. This process is repeated using iron, copper, and brass.

*Example 4*

A polytrifluorochloroethylene homopolymer film is coated with the trifluorochloroethylene/diallyl maleate copolymer produced in accordance with Example 1 above. The coated surface is placed in contact with woven fiberglass and the resulting assembly is pressed as described in Example 2 above. A firmly bonded laminate is thus produced. Similar laminates are produced when the procedure of this example is repeated using canvas, nylon, or heat-resistant Orlon (polyacrylonitrile).

*Example 5*

A polytetrafluoroethylene film is coated with the trifluorochloroethylene/diallyl maleate copolymer produced in accordance with Example 1 above. The coated surface is then placed in contact with another film of polytetrafluoroethylene. This assembly is then heated as described in Example 2 above to produce a bonded laminate. Similar laminates are produced when the procedure of this example is repeated using trifluorochloroethylene/ vinylidene fluoride and trifluorochloroethylene/tetrafluoroethylene copolymers.

It is also within the scope of the present invention to convert the trifluorochloroethylene/diallyl maleate copolymers of this invention to thermosetting resins which are particularly useful as protective coatings. The thermosetting resins are produced by cross-linking of the copolymers. Cross-linking of these copolymers is effected by incorporating within the copolymer a cross-linking agent which may be a peroxy type compound such as benzoyl peroxide, a basic metal oxide such as barium peroxide, an inorganic polysulfide such as the alkali metal and ammonium polysulfides (e.g. hexamethylene dimercaptan) and polyamines such as hexamethylene diamine. In order to effect such cross-linking, the copolymer is heated at a temperature between about 40° C. and about 200° C., for a period of time between about 1 hour and about 48 hours. The concentration of cross-linking agent used is generally between about 0.01 and 100 parts by weight per 100 parts of the copolymer and is preferably between about 1.0 and about 75 parts by weight. The article which is to be coated by these thermosetting resins is dipped into a mixture comprising the trifluorochloroethylene/diallyl maleate copolymer, the cross-linking agent and solvent or dispersant. The mixture is then heated until the article is coated with a viscous layer of resin. Although the solvent may be removed completely by air-drying, the drying time is greatly accelerated by the application of heat. By this relatively simple procedure a variety of shaped articles including very intricate apparatus, are coated with the thermosetting resins derived from the copolymers of this invention.

As indicated above, useful copolymers in the oil and grease range are produced employing the above-described polymerization systems by polymerizing monomer mixtures containing less than about 90 mol percent of trifluorochloroethylene, e.g. about 50 mol percent or less of trifluorochloroethylene, the remaining major constituent being diallyl maleate. Such low molecular weight copolymers find utility as ingredients of cements and adhesives, and as plasitcizers.

Various alterations and modifications of the reactants and reaction conditions employed in the process of this invention may become apparent to those skilled in the art from the accompanying description and disclosure. It is to be understood that monomer mixtures containing fluorine-containing olefins other than trifluorochloroethylene may be similarly interpolymerized with diallyl maleate as described hereinabove to obtain polymers of improved properties. Thus, for example, diallyl maletate may be interpolymerized with tetrafluoroethylene, hexafluoropropene, vinylidene fluoride and any combination thereof including monomer mixtures of trifluorochloroethylene and vinylidene fluoride, without departing from the scope of this invention.

Having described our invention, we claim:

1. A novel copolymer comprising a fluorine-containing olefin combined with between about 0.1 mol percent and about 10 mol percent of an unsaturated ester of maleic acid.

2. A copolymer comprising trifluorochloroethylene combined with between about 0.1 mol percent and about 10 mol percent of diallyl maleate.

3. A copolymer comprising trifluorochloroethylene combined with between about 0.5 mol percent and about 8 mol percent of diallyl maleate.

4. A copolymer comprising trifluorochloroethylene combined with between about 2 and about 6 mol percent of diallyl maleate.

5. A thermoplastic copolymer of trifluorochloroethylene combined with approximately 4 mol percent of diallyl maleate.

6. A process for preparing a polymer which comprises polymerizing a monomeric mixture of fluoroolefin and between about 0.1 mol percent and about 10 mol percent of an unsaturated ester of maleic acid in the presence of a peroxy compound as a polymerization promoter.

7. A process for preparing a polymer of trifluorochloroethylene which comprises polymerizing a monomeric mixture of trifluorochloroethylene and diallyl maleate, said mixture containing between about 0.1 and about 10 mol percent of diallyl maleate at a temperature from about −30° C. to about 100° C. in the presence of a peroxy compound as a polymerization promoter.

8. A process for producing a thermoplastic polymer of trifluorochloroethylene which comprises polymerizing a monomeric mixture of trifluorochloroethylene and diallyl maleate containing between about 0.1 mol percent and about 10 mol percent of diallyl maleate at a temperature between about 0° C. and about 75° C. in an aqueous medium in the presence of a peroxy compound as a promoter.

9. A laminated structure comprising a layer of a normally solid copolymer comprising trifluorochloroethylene combined with between about 0.1 mol percent and about 10 mol percent of diallyl maleate bonded to a surface that remains solid at 100° C.

10. A laminated structure comprising a layer of a normally solid copolymer of trifluorochloroethylene combined with diallyl maleate, said polymer containing from about 0.1 to about 10 mol percent of the diallyl maleate, bonded to a metal.

11. A laminated structure comprising a layer of a normally solid copolymer of trifluorochloroethylene combined with diallyl maleate, said polymer containing from about 0.1 to about 10 mol percent of the diallyl maleate, bonded to a textile surface.

12. A laminated structure comprising a layer of a normally solid copolymer of trifluorochloroethylene combined with diallyl maleate, said polymer containing from about 0.1 to about 10 mol percent of the diallyl maleate, bonded to a polymeric surface.

13. A laminated structure comprising a layer of a normally solid copolymer of trifluorochloroethylene combined with diallyl maleate, said polymer containing from about 0.1 to about 10 mol percent of the diallyl maleate, bonded to a polymer surface of a halogenated olefin polymer.

14. A process for bonding a halogenated olefin polymer surface to another surface that remains solid at 100° C. which comprises applying to at least one of the surfaces a coating comprising a normally solid copolymer of trifluorochloroethylene combined with between about 0.1 mol percent and about 10 mol percent of diallyl maleate, contacting the coated surface with the surface to which it is to be bonded, maintaining the surface in contact at a temperature of at least 100° C. and at a pressure of at least 5 pounds per square inch.

References Cited in the file of this patent

UNITED STATES PATENTS

| Number | Name | Date |
|---|---|---|
| 2,464,826 | Neher et al. | Mar. 22, 1949 |
| 2,511,168 | Martin et al. | June 13, 1950 |
| 2,534,617 | Mohrman | Dec. 19, 1950 |
| 2,549,935 | Sauer | Apr. 24, 1951 |
| 2,554,959 | Rowland | May 29, 1951 |
| 2,626,252 | Tawney | Jan. 20, 1953 |
| 2,654,727 | Otto et al. | Oct. 6, 1953 |
| 2,659,714 | Harman et al. | Nov. 17, 1953 |
| 2,774,702 | Smith | Dec. 18, 1956 |
| 2,774,704 | Smith | Dec. 18, 1956 |
| 2,774,705 | Smith | Dec. 18, 1956 |
| 2,788,306 | Cox et al. | Apr. 9, 1957 |
| 2,833,686 | Sandt | May 6, 1958 |

UNITED STATES PATENT OFFICE

CERTIFICATION OF CORRECTION

Patent No. 2,951,783                  September 6, 1960

Billy F. Landrum et al.

It is hereby certified that error appears in the above numbered patent requiring correction and that the said Letters Patent should read as corrected below.

Column 3, line 60, the formula should appear as shown below instead of as in the patent:

$$-CF_2-CFCl-$$

column 4, line 42, for "and approximately 4 mol percent" read -- and about 0.10 ml. of diallyl --; line 54, for "coplymer" read -- copolymer --; column 7, line 54, for "maletate" read -- maleate --.

Signed and sealed this 13th day of June 1961.

(SEAL)
Attest:

ERNEST W. SWIDER                             DAVID L. LADD
Attesting Officer                                Commissioner of Patents